(12) United States Patent
Seidl et al.

(10) Patent No.: US 7,269,705 B1
(45) Date of Patent: Sep. 11, 2007

(54) MEMORY SPACE MANAGEMENT FOR OBJECT-BASED MEMORY SYSTEM

(76) Inventors: Matthew L. Seidl, 1034 Grant St., Longmont, CO (US) 80501; Gregory M. Wright, 668 Willowgate St., #D, Mountain View, CA (US) 94043; Mario I. Wolczko, 36 Coronado Ave., San Carlos, CA (US) 94070

( * ) Notice: Subject to any disclaimer, the term of this patent is extended or adjusted under 35 U.S.C. 154(b) by 312 days.

(21) Appl. No.: 10/831,415

(22) Filed: Apr. 23, 2004

(51) Int. Cl.
G06F 12/00 (2006.01)
(52) U.S. Cl. ...................... 711/170; 707/205
(58) Field of Classification Search ............... 771/170; 707/205
See application file for complete search history.

(56) References Cited

U.S. PATENT DOCUMENTS

| | | | | |
|---|---|---|---|---|
| 5,822,562 | A * | 10/1998 | Dahlen et al. ............... | 711/170 |
| 5,887,275 | A * | 3/1999 | Nguyen et al. ............. | 711/206 |
| 6,662,191 | B1 * | 12/2003 | Cherniavsky et al. ... | 707/103 X |
| 2005/0154821 | A1 * | 7/2005 | Furuhashi et al. .......... | 711/112 |

OTHER PUBLICATIONS

Jones et al., "Garbage Collection: Algorithms for Automatic Dynamic Memory Management," 1996, John Wiley & Sons Ltd.

* cited by examiner

*Primary Examiner*—Donald Sparks
*Assistant Examiner*—Hahem Farrokh
(74) *Attorney, Agent, or Firm*—Martine Penilla & Gencarella, LLP

(57) ABSTRACT

A method for pre-allocating memory for object-based cache data is provided in which request for an object having an associated property parameter that defines the memory requirements for the object. In response, a table of allocation buckets is searched for a bucket having the associated property parameter that can at least meet the memory requirements for the requested object. If an object identifier (OID), having a previously allocated physical address in main memory, is identified in the table of allocation buckets then the identified OID is assigned to the object. The object is stored in the object cache with the assigned OID, and the OID is removed from the bucket. Also included is a table of allocation buckets in a computer system in which each of a plurality of buckets is capable of holding object identifiers (OIDs). Each object identifier (OID) has a pre-allocated physical memory, with buckets of the table of allocation buckets being replenished by recycling a previously used OID when the object associated with the OID is reclaimed.

19 Claims, 8 Drawing Sheets

MEMORY SPACE MANAGEMENT FOR OBJECT-BASED MEMORY SYSTEM

CROSS REFERENCE TO RELATED APPLICATIONS

This application is related to: (1) U.S. patent application Ser. No. 10/124,122, filed on Apr. 17, 2002, entitled "Locating References and Roots for In-Cache Garbage Collection"; (2) U.S. patent application Ser. No. 10/335,621, filed on Jan. 2, 2003, entitled "Method and Apparatus for Skewing A Bi-Directional Object Layout to Improve Cache Performance"; and (3) U.S. patent application Ser. No. 10/072,169, filed on Feb. 7, 2002, entitled "Object Addressed Memory Hierarchy". Each of these U.S. Patent Applications is incorporated herein by reference.

BACKGROUND OF THE INVENTION

1. Field of the Invention

The present invention relates generally to the design of a computer system that supports an object-based memory hierarchy where the system manages objects. More specifically, the present invention relates to a method and apparatus for the efficient allocation of memory, by pre-allocating physical memory addresses to object identifiers.

2. Description of the Related Art

As object-based systems become widespread, the need for storing a large number of objects is becoming increasingly important. As processor speeds rise, these object stores need to provide fast access to large collections of repeatedly used objects so that system throughput is not interrupted.

FIG. 1 illustrates an example of a typical memory hierarchy for a conventional object-based system 100. The system 100 includes a processor 110, which is connected to an object cache 112. The object cache 112 is connected to a translator 114, which is connected to main memory 118. The main memory 118 is indexed by physical addresses 119 and is shown to include an object table 116.

The object cache 112 is a form of fast memory holding recently accessed objects. A cache line in the object cache 112 generally contains part of an object or a whole object. The objects stored in the object cache 112 are accessed through load or store instructions. Within each such instruction, the part of the object being accessed is identified by two components, an object identifier (OID) and an offset. These two components form an address which is used to access the objects stored in the object cache 112 without having to access the main memory 118.

However the problem arises when there is a cache miss such as a load or store request that cannot be satisfied by the object cache 112. In such situations the main memory has to be accessed using a physical address 119. The translator 114 uses an object table 116 to obtain the physical address 119 corresponding to an object, as illustrated by arrow 115. For each object in the main memory 118 there is a corresponding object table entry 117 that contains the corresponding physical address 119. The translator 114 uses the OID as an index into the object table 116 to obtain the physical address 119 for an object.

In the above described scheme, the translator 114 is also assigned the task of allocating memory when a new object is to be stored in the main memory 118. The allocation process through the translator 114 involves finding the object table entry 116 and assigning to it a free memory address range in the main memory 1118. However, the process of going through the translator 114 to allocate memory space in the main memory 118 can be time consuming and may result in delay. Furthermore, in cases where a garbage collector deallocates objects which are no longer in use, in order to reclaim memory, the objects need to be completely dismantled. The garbage collector may be required to clear the object table entry 117 for each reclaimed object, which is likely to entail a cache miss. Later, when the same OID is reused, the object table entry 117 must be rebuilt, which again is likely to entail a cache miss. These additional steps can significantly slow both the allocation and reclamation operations.

Also, at the present time the memory allocation by the translator 114 is accomplished by hardwiring an allocation strategy into the translator. This complicates the design of the translator. As there are different types of allocating algorithms presently available it would be limiting on the functionality of an object-based system to have a particular allocation strategy hardwired into the translator for the life of the system.

In view of the foregoing, there is a need for an object-based system that simplifies the process of translating and allocating memory space when objects are to be stored in the main memory, and further, there is a need for an allocation scheme that can be easily improved or modified in accordance with improvements in technology or application.

SUMMARY OF THE INVENTION

Broadly speaking, the present invention fills these needs by providing an object-based system that simplifies the process of translation and allocation of memory addresses by having two separate entities doing the translation and allocation.

It should be appreciated that the present invention can be implemented in numerous ways, including as a process, an apparatus, a system, a device, or a method. Several inventive embodiments of the present invention are described below.

In one embodiment, a method for pre-allocating memory for object-based cache data is provided. The method includes receiving an allocation request for an object having an associated property parameter that defines the memory requirements for the object. In response, a table of allocation buckets is searched for a bucket having the associated property parameter that can at least meet the memory requirements for the requested object. If an object identifier (OID), having a previously allocated physical address in main memory, is identified in the table of allocation buckets then the identified OID is assigned to the object. The object is stored in the object cache with the assigned OID, and the OID is removed from the bucket.

In another embodiment, a table of allocation buckets in a computer system is provided. The table of allocation buckets includes a plurality of buckets and each bucket is capable of holding object identifiers (OIDs). The OIDs held by the buckets are previously allocated to a physical memory address.

In yet another embodiment, a method for pre-allocating memory for object-based cache data is provided. The method includes receiving an allocation request for an object having an associated property parameter that defines the memory requirements for the object. In response, a table of allocation buckets is searched for a bucket having the associated property parameter that can at least meet the memory requirements for the requested object. If it is determined that the searched bucket does not contain an object identifier then a new OID is acquired and a physical memory address is allocated to the new OID. The new OID is added to the bucket. The new OID is then assigned to the requested object and then the object is stored in an object cache at a location indexed by the assigned OID. The OID is then removed from the bucket.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is disclosed for pre-allocating physical addresses in an object-based memory system. Further, the invention relates to an object-based system that simplifies the process of translating and allocating memory space when objects are to be stored in the main memory, by allowing translation and allocation to be performed by two separate entities (e.g., the translator and the processor, using the table of allocation buckets) in a memory hierarchy.

Figure 1:
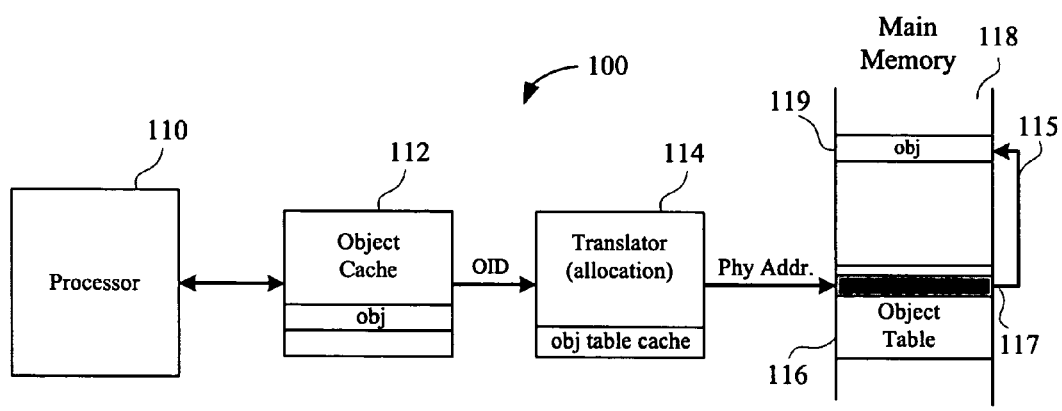
FIG. 1 is a high level schematic overview of an object-based computer system.
Figure 2:
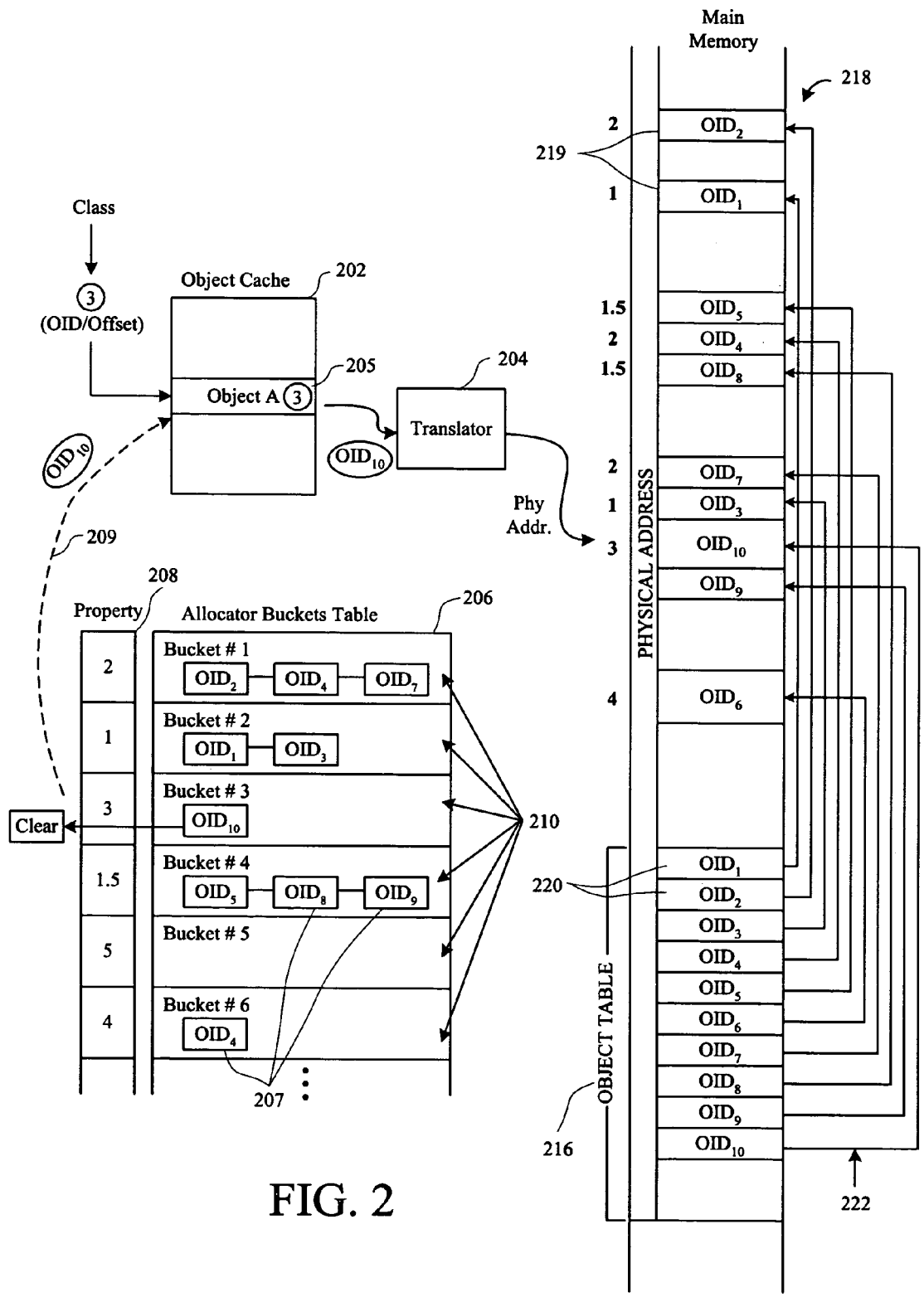
FIG. 2 illustrates an object-based computer system utilizing a table of allocation buckets, wherein the buckets have a readily available OID for a requested object in accordance with one embodiment of the invention.

FIG. 2 illustrates object-based caching in a computer system where the physical addresses for objects are pre-allocated in the main memory. The system may include one or more processors (not shown). Each processor is associated with an object cache 202 that is connected to a translator 204. The object cache 202 holds cache lines such as cache line 205, which contain a whole object or part of an object. An object A is shown as an example. The translator 204 is in communication with a main memory 218, which is also commonly referred to as physical memory. The main memory 218 is indexed by physical addresses 219 and is shown to include an object table 216. The processor is further in communication with a table of allocation buckets 206, also contained within main memory 218. In one embodiment, the table of allocation buckets will be a software construct and may be stored in any of the caches that the CPU may have.

The table of allocation buckets includes buckets 210, where each bucket is capable of holding object identifiers (OIDs) 207. Each individual OID in a bucket has a pre-allocated physical address 219 associated with it in the main memory 218. The OIDs 207 are grouped in the allocation buckets 210 according to a property parameter 208 of an object to be stored. The OIDs 207 with the same property parameter are linked together by a linked list in each bucket 210. In one embodiment, the property parameter 208 is a function of the size and the number of references contained in the object. Other property parameters may include read/write, read only, various kinds of remote sharing, permanent objects, and collectable objects.

For purposes of example and understanding, the property parameter will be denoted by numbers, such as 1, 1.5, 2, 3, 4, 5 etc. Thus, for the example, each number will represent a size of the object and thus the amount of allocated physical memory. In FIG. 2, an object having a property parameter 3 is requested. In response, a bucket 210 is selected from the table of allocation buckets 206. In this instance, the OID 10 is selected because OID 10 belongs to the bucket 210 having the matching property 3 as the requested object. Thus OID 10 is removed from the table of allocation buckets 206 and is assigned to the object being stored in object cache 202 as illustrated by the dotted arrow 209. It can be seen that the OID 10 already has a pre-allocated physical address 219 in the main memory 218. The OID 10 now references an object table index 220 in the object table 216, which has a pointer 222 (that was pre-allocated) that corresponds to the physical address 219 of OID 10. The OID 10 is removed from the table of allocation buckets 206 to signify that OID 10 is being used by the object A, thus preventing allocation of the same OID to another object.

Figure 3:
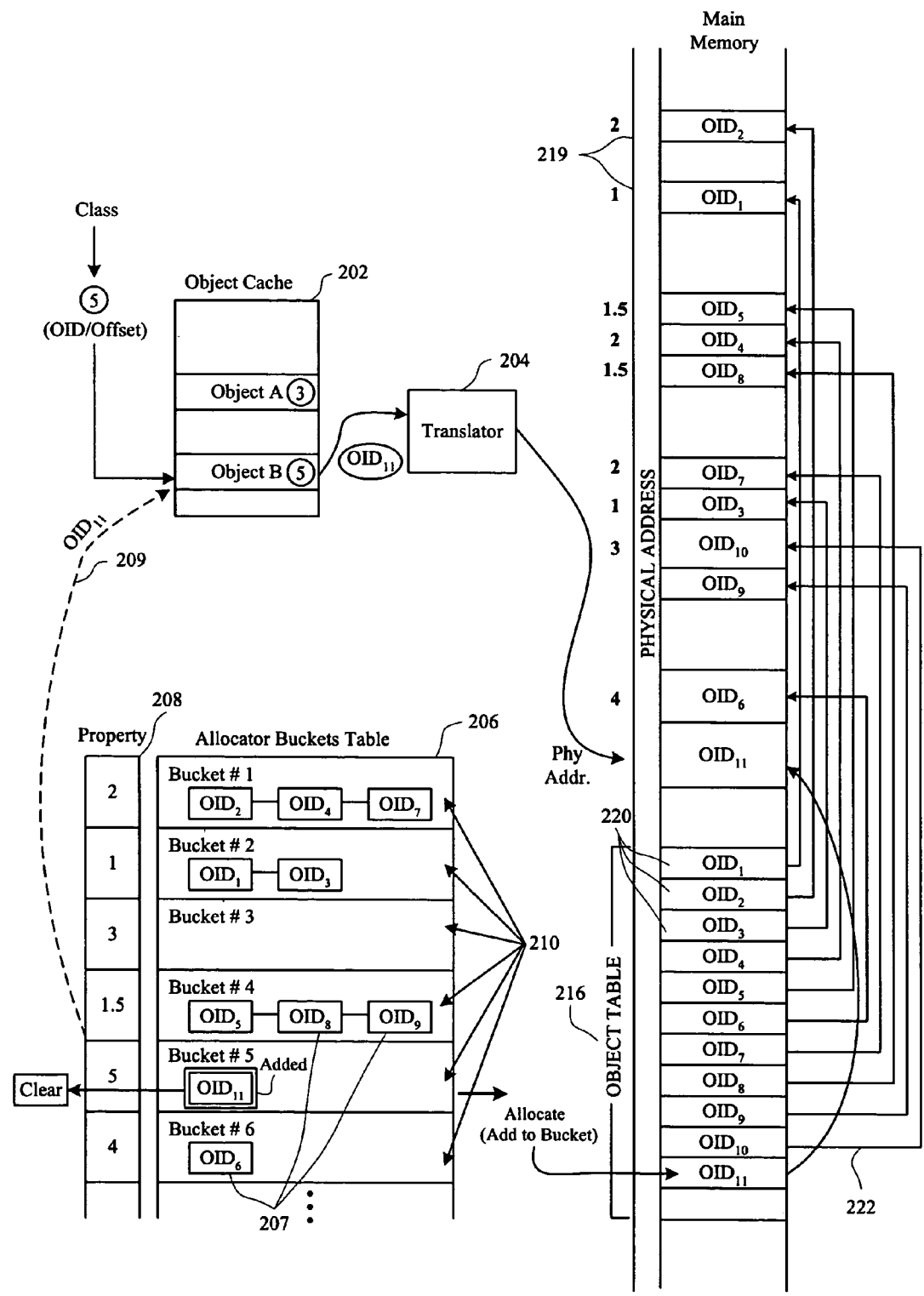
FIG. 3 illustrates an object-based computer system utilizing a table of allocation buckets wherein the buckets do not have a readily available OID for a requested object in accordance with one embodiment of the invention.

Reference is made to FIG. 2 and FIG. 3, which illustrates another embodiment of the invention, where an OID 207 is not present in the table of allocation buckets 206 for a property parameter of 5. In this example, however, an object with property parameter 5 is requested. In FIG. 2, the bucket 210 with the matching property parameter is empty. Therefore, a process to allocate memory and OIDs for a property parameter of 5 is executed to populate at least the bucket for property parameter 5 in the table of allocation buckets 206. The allocation process involves first creating a new OID 207 in the object table 216 and allocating appropriate physical memory depending on the size of the object and returning a corresponding physical address 219 for the new OID. Subsequently, a new OID, OID 11 is added into the table of allocation buckets 206. As illustrated, the reference to OIDs 207 refers to OIDs in general, and thus denotes the OIDs illustrated in the figures.

Now that there is a new OID, OID 11, in the table of allocation buckets with property parameter 5, the OID can be assigned to the object that is being requested. The assigned OID 11 is removed from the table of allocation buckets (as illustrated by the "clear" denotation in FIG. 3) to prevent reallocation of the same OID 11 to a future allocation request.

As can be seen, the methods of the invention relieve the translator 204 from performing any allocation. In the present invention, the translator 204 is left with the sole function of translating OIDs 207 to physical addresses. Moreover, in an embodiment, the table of allocation buckets 206 is initially filled with OIDs 207 having pre-allocated physical addresses. As the OIDs 207 in the buckets 210 get depleted, they are replenished with new OIDs having pre-allocated physical addresses 219. This way an OID 207 is readily available and is waiting to be assigned to a requested object. Not only may this avert cache misses but it also attempts to avoid any delay connected with accessing main memory 218 through the translator 204 where the translator 204 is required to perform the allocating function.

In cases where the translator is designed to do the allocating function, a particular allocation strategy generally has to be wired into the translator. Consequently, the functionality of the system is limited due to the system's dependence on a particular allocation strategy. Even when new and improved allocation strategies become available the system is limited to the original hardwired strategy for the life of the system. Whereas, the present invention virtually eliminates the complexity resulting from the hardwiring of the translator, by having buckets 210 populated by OIDs 207 with preallocated physical addresses 219 in the table of allocation buckets 206. In an embodiment, the allocation strategy will be implemented in software, where the table of allocation buckets is a software construct, so that the construct may be cached in whatever caches the CPU may have available. As a result, improved technology may be easily incorporated into the existing system. Also, the system may be tailored according to the application for which it may be used.

Figure 4:
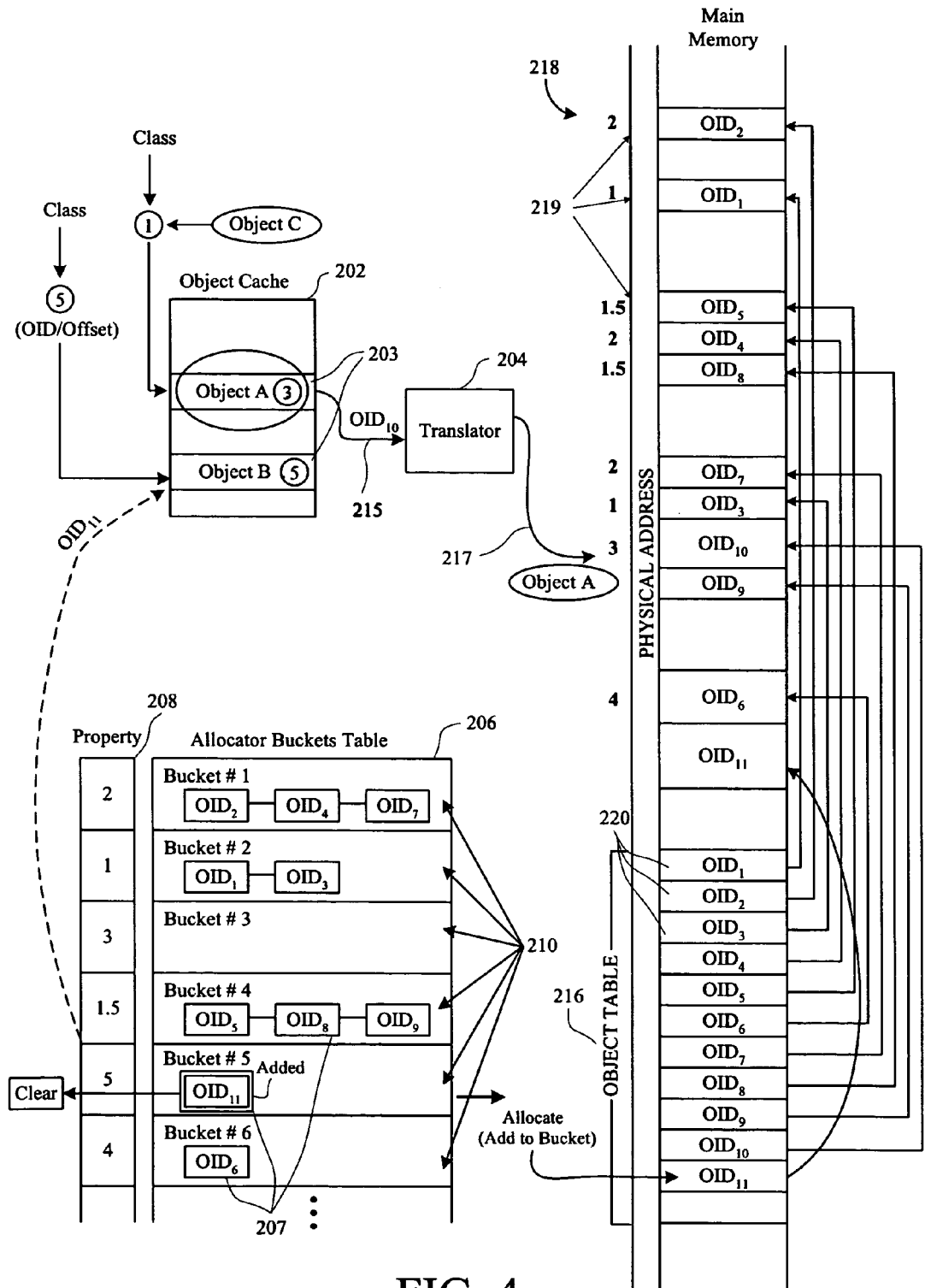
FIG. 4 illustrates an object-based computer system in which an object with a pre-allocated physical memory address is being moved into the main memory without the translator having to allocate new locations in the main memory in accordance with one embodiment of the invention.
Figure 5:
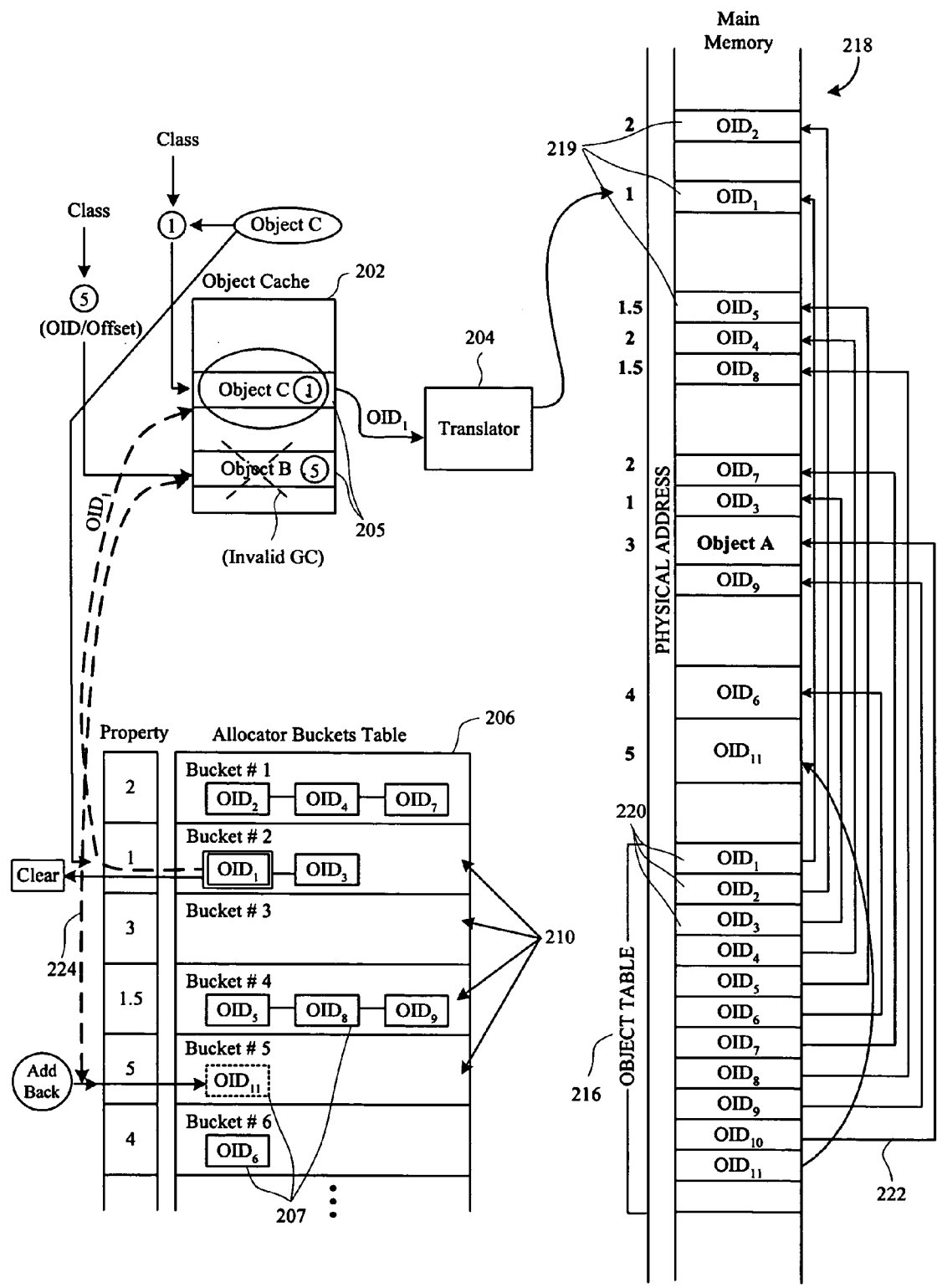
FIG. 5 illustrates an object-based computer system in which an OID of a reclaimed object is recycled without causing new allocation in the main memory.

Reference is made to FIG. 2, FIG. 3, and FIG. 4, which illustrates another embodiment of the invention where an object A is requested to be moved from the object cache 202 into the main memory 218. Oftentimes when a set in the object cache 202 is full, a cache line of an object 203 is requested to be moved from the object cache 202 to the main memory 218 in order to make room for another object cache line. The cache line is moved through the translator 204 and is stored in the physical address 219 of the main memory 218. It should be understood that the reference to physical address 219 refers to all the physical addresses. Here, object A is being moved into the main memory 218 to make room for object C. Object A has an OID 10 that already has a pre-allocated physical address 219 in the main memory 218 in accordance with an embodiment of the present invention. The object A is first moved into the translator 204 as shown by the arrow 215. The translator 204 then translates the OID 10 to its corresponding physical address 219 in the main memory 218 and stores object A in the main memory as indicated by the arrow 217 without having the translator 204 performing any allocation.

Object-based systems frequently use automated garbage collection by a garbage collector (not shown). Garbage collection generally involves deallocation of objects by reclaiming the allocated memory of objects which are no longer in use. A garbage collector may be required to clear the object table entry 220 of the reclaimed object from the object table 216. Moreover, when the same OID 207 is reused in the future, the object table entry 220 must be rebuilt with a physical address 219. These steps can entail several cache misses leading to system slow down.

Reference is made to FIG. 2, FIG. 3, FIG. 4, and FIG. 5, which illustrate an embodiment of the invention where the OIDs of the reclaimed or invalid objects are recycled. According to FIG. 5, object B is garbage. Object B has a property parameter 5 and it has the OID 11. In this embodiment of the present invention the OID 11 remains in the object table entry 220 subsequent to garbage collection. The OID 11 continues to have a valid pre-allocated physical address 219 in the main memory 218 following the garbage collection. The OID 11 is stored back in the table of allocation buckets 206, in the bucket 210 having the property parameter 5, as indicated by arrow 224. Thus OID 11 may be reused when an object requiring property parameter 5 is requested in the future. This way the garbage collector is not performing the additional operations of clearing OID 11 from the object table entry 220. Also, the object table entry 220 is not rebuilt when an object with a property parameter 5 is requested in the future.

Figure 6:
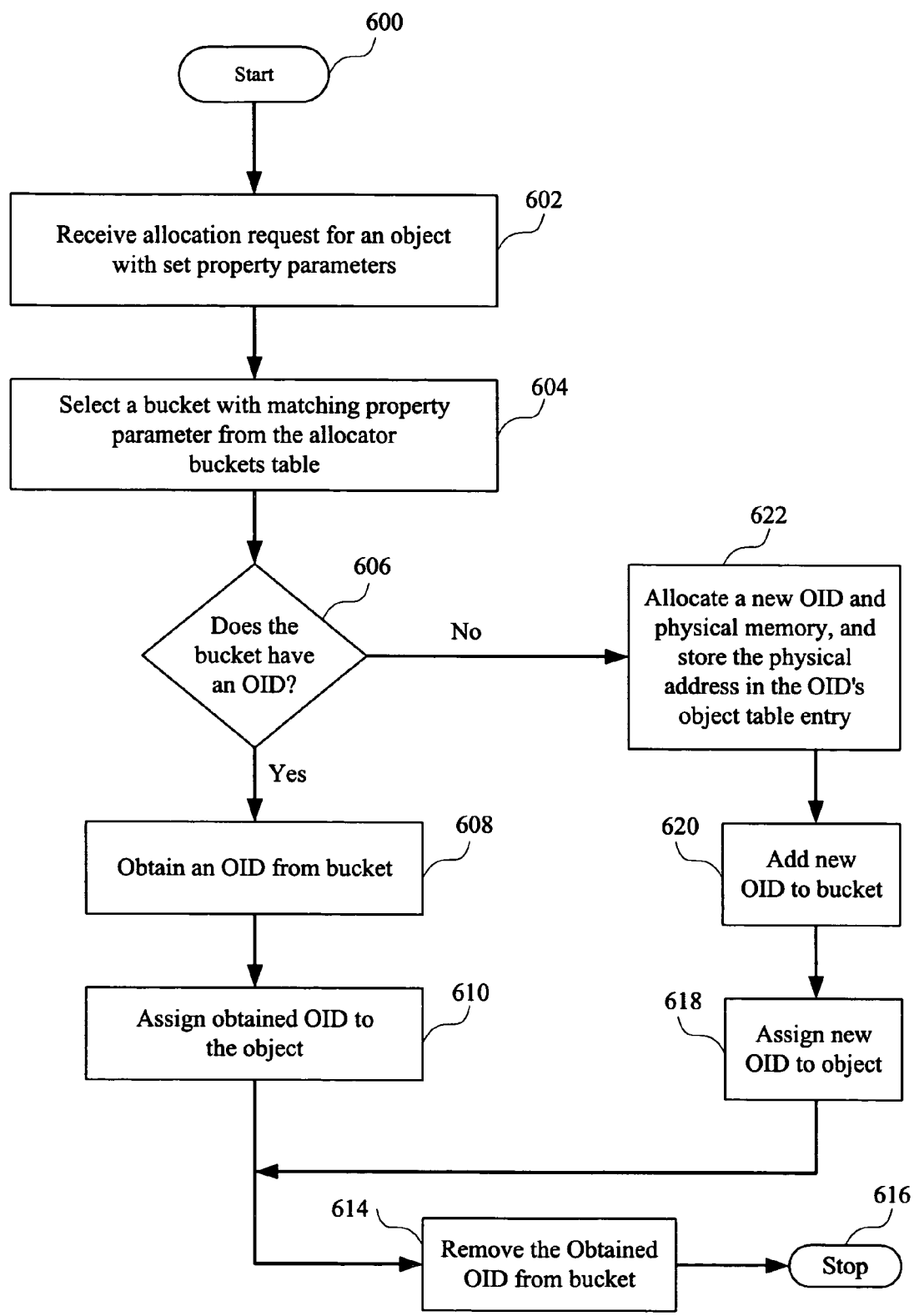
FIG. 6 illustrates a flowchart for pre-allocating physical memory for objects in a main memory in accordance with one embodiment of the invention.

FIG. 6 illustrates a flow chart of the operations involved in pre-allocating physical memory addresses for object-based cache data. A request for an object of a particular property parameter is received in operation 602. Based on the property parameter, a bucket from a table of allocation buckets is selected and examined for an OID for the requested object in operation 604. If an OID is present in the selected bucket, as noted in operation 606, then the OID is fetched from the bucket in operation 608 and is assigned to the requested object in operation 610. The OID list is then adjusted, as the OIDs are stored in buckets through a linked list operation. It is understood that a linked list is only an example and other techniques such as a doubly linked list or binary (balanced or otherwise) tree may also be used.

In operation 614, the fetched OID is removed from the table of allocation buckets to avoid reallocation of the same OID to another requested object in the future. If an OID is not found in the bucket, then a new OID is created by allocating physical memory for the new OID. The corresponding object table entry 220 for the new OID is created containing this physical memory address. The new OID is added to the bucket with a matching property parameter in operation 620. The new OID is assigned to the requested object and the object is stored in the object cache with the new OID in operations 618 and 612. The assigned OID is removed from the bucket to avoid reallocation of the same OID to another requested object in the future in operation 614.

Figure 7:
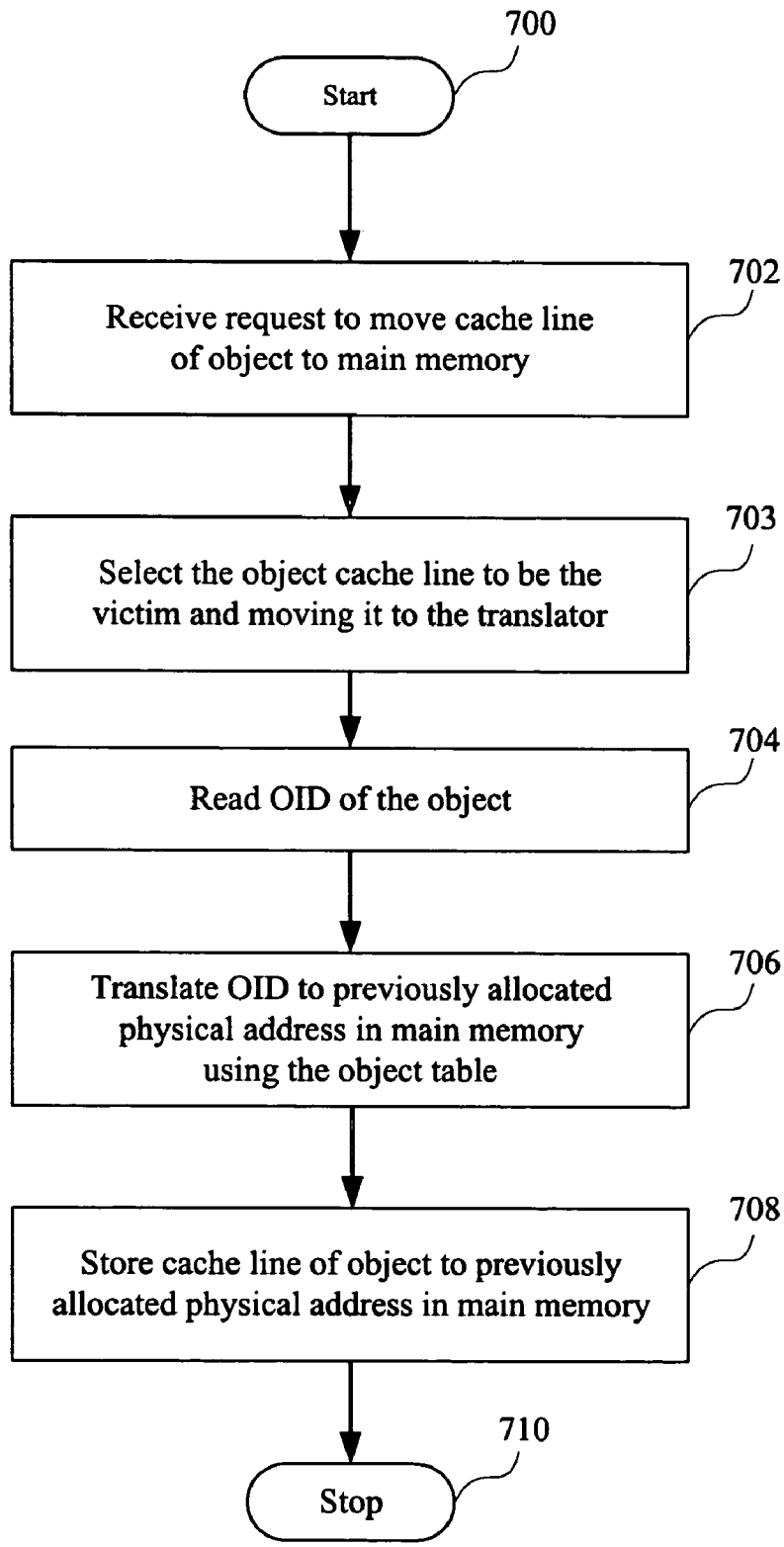
FIG. 7 illustrates a flowchart for moving objects from object cache to the main memory in accordance with one embodiment of the invention.
Figure 8:
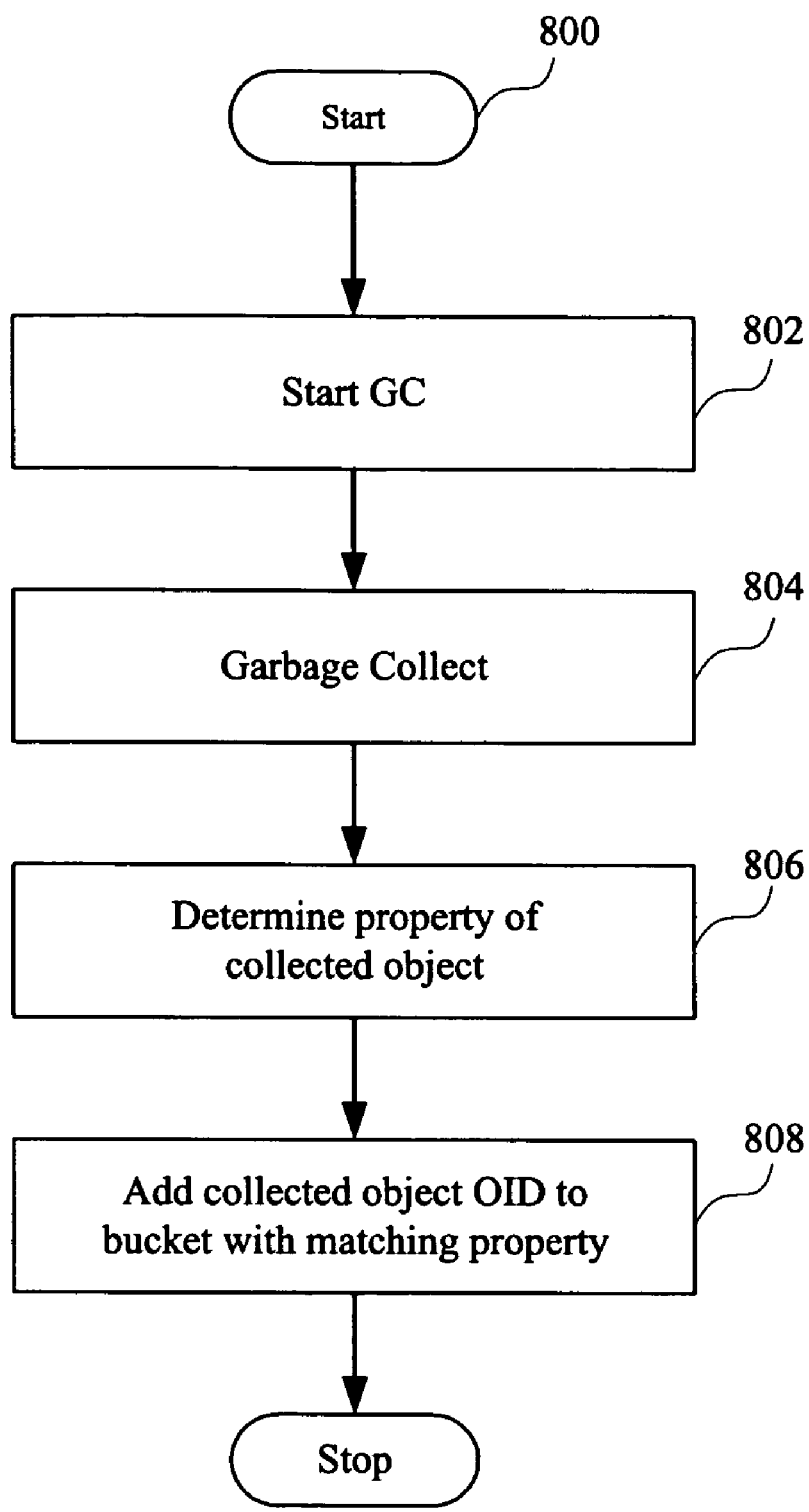
FIG. 8 illustrates a flowchart for recycling OIDs of reclaimed objects in accordance with one embodiment of the invention.

When a set in an object cache is full, a cache line of an object needs to be moved from the object cache to the main memory to make room for a newly requested object. FIG. 7 illustrates the operations involved in moving a cache line of an object through a translator when the object already has a pre-allocated physical address in the main memory. First, a request to move an object's cache line from the object cache to main memory is received in operation 702. The victim is selected and it is moved to a translator in operation 703. The translator reads the OID and translates the OID to a previously allocated physical address in the main memory without doing any new allocation of main memory in operations 704 and 706. The object is then stored to the previously allocated physical address in main memory in operation 708.

GC is initiated as shown in operation 802, and the garbage collection is done in operation 804. As explained above, garbage collection generally involves deallocation of objects by reclaiming the allocated memory of objects which are no longer in use. However, the physical address and the corresponding object table entry of the object are not cleared from the main memory, and therefore the OID of the garbage collected object remains valid. Then, the property parameter of the garbage collected object is determined in operation 806. The OID of the object is subsequently added back into the bucket in operation 808, so that the OID can be recycled without having to repeat the allocation process.

With the above embodiments in mind, it should be understood that the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for pre-allocating memory for object-based cache data, comprising:
    receiving an allocation request for an object having an associated property parameter that defines memory requirements for the object;
    locating in a table of allocation buckets a bucket having the associated property parameter that can at least meet the memory requirements for the object;
    identifying an object identifier (OID) in the bucket, the OID in the bucket having been previously allocated a physical memory address;
    assigning the OID to the object;
    storing the object in an object cache along with the assigned OID;
    removing the identified OID from the bucket once it has been assigned to the object, the removal signifying that the OID is in use;
    receiving a request to move a cache line of the object with the assigned OID from an object cache to main memory;
    reading the OID of the object mapping to the previously allocated physical memory address; and
    storing the object to the previously allocated physical memory address without causing new allocation of main memory.

2. A method for pre-allocating memory for object-based cache data as recited in claim 1, wherein the property parameter includes a definition of size and number of references for the object, which further defines the memory requirements for the object.

3. A method for pre-allocating memory for object-based cache data as recited in claim 1, wherein the table of allocation buckets includes a plurality of buckets, each bucket having an associated property parameter, and each bucket capable of holding object identifiers (OIDs).

4. A method for pre-allocating memory for object-based cache data as recited in claim 3, wherein each of the OIDs has been previously allocated physical memory addresses in a physical memory.

5. A method for pre-allocating memory for object-based cache data as recited in claim 3, wherein buckets of the table of allocation buckets are initially populated with OIDs.

6. A method for pre-allocating memory for object-based cache data as recited in claim 3, wherein buckets of the table of allocation buckets are replenished with one or more OIDs when no OID is present in the selected bucket.

7. A method for pre-allocating memory for object-based cache data as recited in claim 3, wherein buckets of the table of allocation buckets are replenished with one or more OIDs when an OID is requested having the property parameter of the selected bucket and no OID is present in the selected bucket.

8. A method for pre-allocating memory for object-based cache data as recited in claim 3, wherein buckets of the table of allocation buckets are replenished by recycling a previously used OID when the object associated with the OID is reclaimed.

9. A table of allocation buckets in a computer system, comprising:
    a plurality of buckets, each bucket capable of holding object identifiers (OIDs), and each object identifier (OID) having pre-allocated physical memory, with buckets of the table of allocation buckets being replenished with one or more OIDs when an OID is requested having the property parameter of the selected bucket and no OID is present in the selected bucket.

10. A table of allocation buckets in a computer system as recited in claim 9, further comprising;
    a property parameter being associated with each bucket.

11. A table of allocation buckets in a computer system as recited in claim 10, wherein the property parameter is a function of the size and number of references contained in the object, which further defines the memory requirements for the object.

12. A table of allocation buckets in a computer system as recited in claim 9 wherein the table of allocation buckets provides OIDs to objects to be stored in an object cache.

13. A table of allocation buckets in a computer system as recited in claim 9, wherein buckets of the table of allocation buckets are initially populated with OIDs.

14. The table as recited in claim 9 wherein buckets of the table of allocation buckets are replenished with one or more OIDs when an OID is requested having the property parameter of the selected bucket and no OID is present in the selected bucket.

15. A method for pre-allocating memory for object-based cache data, comprising:
    receiving an allocation request for an object having an associated property parameter that defines memory requirements for the object;

locating in a table of allocation buckets a bucket having the associated property parameter that can at least meet the memory requirements for the object;

if the bucket fails to contain an object identifier (OID), the method includes, allocating physical memory for a new OID;

adding the new OID to the bucket;

assigning the new OID to the object; and storing the object in an object cache along with the assigned OID.

16. The method as recited in claim 15 further including receiving a request to move a cache line of the object with the assigned OID from an object cache to main memory; reading the OID of the object mapping to the previously allocated physical memory address; and storing the object to the previously allocated physical memory address without causing new allocation of main memory.

17. The method for pre-allocating memory for object-based cache data as recited in claim 15 wherein the property parameter includes a definition of size and number of references for the object, which further defines the memory requirements for the object.

18. The method for pre-allocating memory for object-based cache data as recited in claim 15 wherein the table of allocation buckets includes a plurality of buckets, each bucket having an associated property parameter, and each bucket capable of holding object identifiers (OIDs).

19. The method as recited in claim 15 further including removing the OID from the bucket once it has been assigned to the object, the removal signifying that the OID is being used by the object.

* * * * *